UNITED STATES PATENT OFFICE.

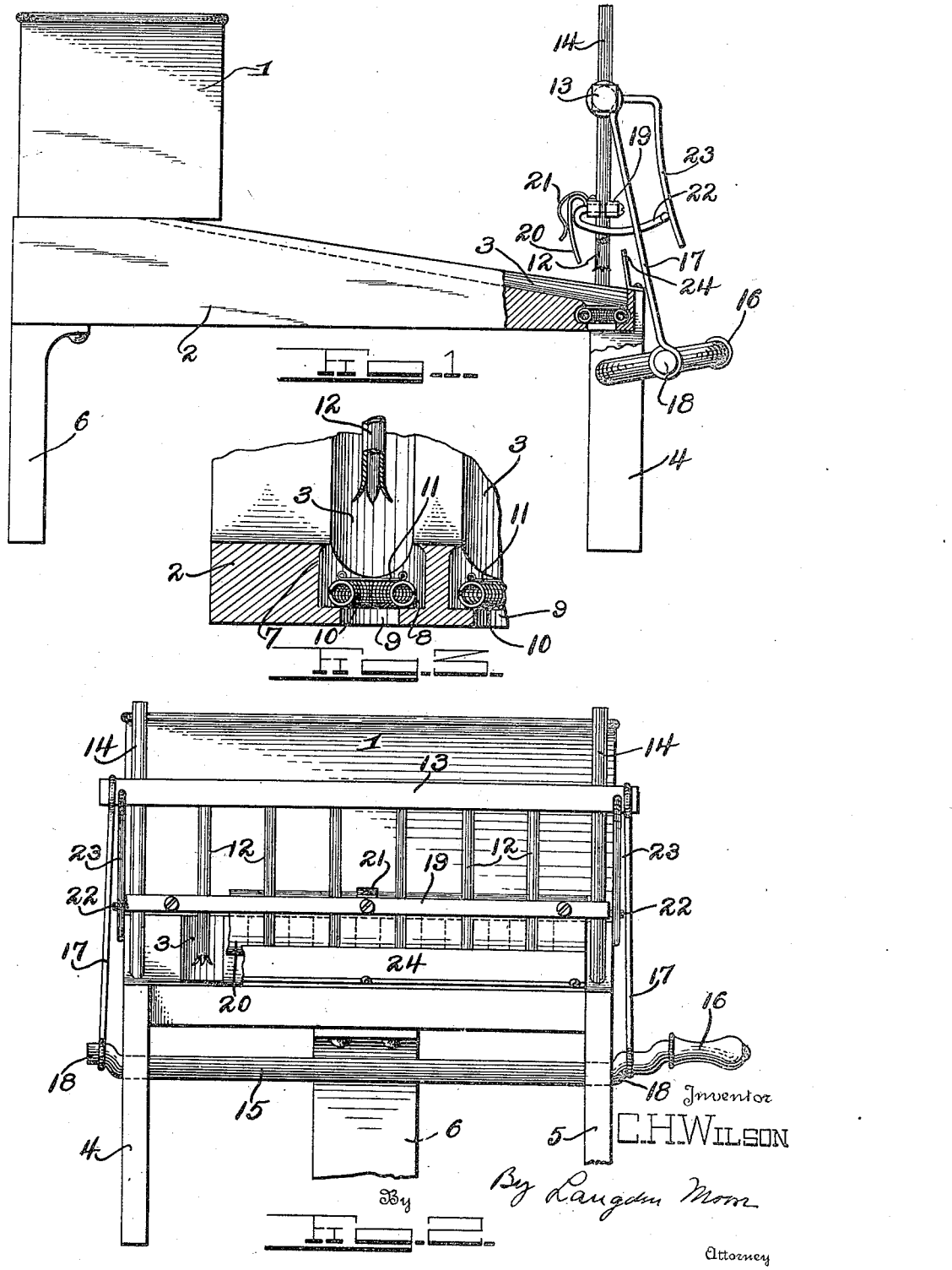

CHARLES H. WILSON, OF GLENS FALLS, NEW YORK.

FRUIT-PITTER.

1,203,830.

Specification of Letters Patent.  Patented Nov. 7, 1916.

Application filed February 26, 1916. Serial No. 80,603.

*To all whom it may concern:*

Be it known that I, CHARLES H. WILSON, a citizen of the United States, residing at Glens Falls, in the county of Warren and State of New York, have invented new and useful Improvements in Fruit-Pitters, of which the following is a specification.

This invention relates to improvements in vegetable cutters and more particularly to a device for removing stones or pits from cherries and like fruits.

It is the object of this invention to provide a device for removing stones, pits, or seeds from fruit which is simple in construction and easy to operate and one that will expel the stone, pit, or seed without breaking or otherwise damaging the fruit by employing a seat for the fruit during the operation that will adjust itself to any irregularity in the size of the fruit for which it is desired.

Among the advantages of this device is the flexible seat which will allow the pit to be pushed through irrespective of the shape or size of the fruit and thus avoid clogging of the device.

While the preferred form of this invention is illustrated upon the accompanying sheet of drawing, yet it is to be understood that minor detail changes may be made without departing from the scope thereof.

Figure 1 is a view in side elevation, partly in section, of this invention as applied to a cherry pitter. Fig. 2 is a view in front elevation of the same. Fig. 3 is an enlarged detail sectional view of the self-adjusting flexible fruit seat.

While this invention may be adapted to remove the stones, pits, or seeds from many fruits, the embodiment of this invention for removing the pits from cherries is illustrated and described herein.

The cherries are placed in a hopper 1 supported above a table 2, the upper surface of which inclines downwardly and away from the hopper and is provided with a plurality of spaced apart grooves 3 through which the cherries will descend by gravity to the pitting mechanism. The table is preferably supported by two legs 4 and 5 at each end of the pitting mechanism and a central leg 6 under the hopper.

The lower end of the groove 3 is terminated short of the front edge of the table to provide a stop for the descending cherries and the table at this point is provided with a vertical circular operating chamber 7 of slightly greater diameter than the width of the groove and the bottom 8 is provided with a concentric opening 9 of less diameter through which the cherry pits drop. A flexible self-adjusting seat for the cherries, preferably in the form of a coil spring arranged in the form of an annulus 10, is secured upon the bottom 8 of the vertical operating chamber and held in place by transverse wires 11 secured to the opposite walls.

The pitting mechanism comprises a vertical rod 12 mounted over each seat carried by a horizontal beam 13 mounted to reciprocate upon vertical guides 14 at each end of the table, preferably by an operating shaft 15 mounted in bearings in the front legs 4 and 5 of the table having a handle 16 and connecting rods 17 pivotally connected to cranks 18 of the shaft and the exterior ends of the pitter rod beam 13. The pitter rods 12 are preferably of metal tubing with the thrust ends expanded and serrated so that upon their downward stroke the cherries resting upon the flexible seats will be cut upon contact, the pit held while being forced through, and the cherries held upon the rods as they ascend, the pits dropping through the opening 9 in the seat.

To remove the pitted cherries retained upon the rods 12 a clearing beam 19, through which the rods 12 pass, is rigidly secured to the vertical guides 14 adjacent the upward end of travel of the rods to engage the cherries and clear the rods. To prevent the cherries so cleared from falling back upon the seat an ejector member 20 is pivotally secured to the rear of the clearing beam 19 having a spring 21 normally holding an arm 22 extending from the rejector in engagement with a guide arm 23 depending from the pitter rod beam 13 in the form of a cam of such shape that the ejector upon the downward stroke of the beam will be held at the back and clear of the depending pitter rods but upon the upper stroke of the beam as the rods approach the upper end of movement and bring the cherries retained thereon in engagement with the clearing beam will allow the ejector to swing forward and thereunder so that as the cherries are cleared they will fall upon the ejector and be thrown off the front of the table into a receptacle provided therefor.

If desired, an inwardly inclined fender 24 may be provided along the front of the table to assist the ejector in insuring that none of the cherries will fall back upon the seat.

While this device is illustrated as being hand operated and adapted to pit six cherries at a time, it is to be understood that the application of foot or other power is contemplated and the number of pitting rods may be increased or decreased without departing from the scope of this invention.

What I claim is:—

1. In a device of the character described, an operating chamber having an opening in the bottom, means for delivering fruit to the chamber, a reciprocating pitter rod mounted centrally thereover, a continuous coil spring forming a flexible self-adjusting seat therein, the end of the rod being hollow, expanded and serrated to cut the fruit and engage the pit upon the downward stroke and retain the fruit upon the rod upon the upward stroke, means to clear the rod of the fruit, and means to reciprocate the rod.

2. In a device of the character described, an operating chamber having an opening in the bottom, means for delivering fruit into the chamber, a reciprocating pitter rod mounted centrally thereover, a self-adjusting seat therein, means to reciprocate the rod therethrough, and a spring-pressed ejector pivoted to the rear of the pitter rod, and an arm extending from the ejector, a guide coacting therewith and operated by the reciprocating means of the pitter rod to hold the ejector out of the path of the rod during the downward stroke and bring the ejector thereunder as the rod approaches the upper end of the stroke.

CHARLES H. WILSON

Witnesses:
JAMES McPHILLIPS,
KATHRYN D. COLLINS.

Copies of this patent may be obtained for five cents each, by addressing the "Commissioner of Patents, Washington, D. C."